United States Patent
Jepsen et al.

(10) Patent No.: US 9,912,410 B1
(45) Date of Patent: Mar. 6, 2018

(54) OPTICAL RADIO-FREQUENCY DOWN-CONVERSION AND REMOTING

(71) Applicant: Rockwell Collins, Inc., Cedar Rapids, IA (US)

(72) Inventors: Kim S. Jepsen, Ellicott City, MD (US); Raymond Zanoni, Columbia, MD (US); Wenlu Chen, Clarksville, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/258,829

(22) Filed: Sep. 7, 2016

(51) Int. Cl.
*H04J 14/02* (2006.01)
*H04B 10/516* (2013.01)
*H04B 10/50* (2013.01)
*H04B 10/61* (2013.01)

(52) U.S. Cl.
CPC ....... *H04B 10/5161* (2013.01); *H04B 10/503* (2013.01); *H04B 10/612* (2013.01); *H04B 10/616* (2013.01); *H04J 14/02* (2013.01)

(58) Field of Classification Search
CPC .............. H04B 10/5161; H04B 10/616; H04B 10/612; H04B 10/503; H04J 14/02

USPC .......................................................... 398/79
See application file for complete search history.

(56) References Cited

U.S. PATENT DOCUMENTS

| | | | | |
|---|---|---|---|---|
| 6,643,417 B2* | 11/2003 | Strutz | ...................... | H03D 9/00 359/326 |
| 7,865,085 B2* | 1/2011 | Kikushima | ...... | H04B 10/25751 398/183 |
| 8,456,336 B1* | 6/2013 | Zanoni | ...................... | G02F 7/00 341/137 |
| 8,779,955 B1* | 7/2014 | Zanoni | ...................... | G02F 7/00 341/132 |

* cited by examiner

*Primary Examiner* — Juan A Torres
(74) *Attorney, Agent, or Firm* — Angel N. Gerdzhikov; Donna P. Suchy; Daniel M. Barbieri

(57) ABSTRACT

A system for optically down-converting a radio-frequency signal includes phase modulators in a push-pull configuration. Separately tuned optical bandpass filters pass through one or more harmonics and inverse harmonics based on the RF signal to produce a local oscillator. A balanced photodetector receives a coherent interference signal and derives the down-converted local oscillator from a filtered harmonic and inverse harmonic.

20 Claims, 11 Drawing Sheets

US 9,912,410 B1

OPTICAL RADIO-FREQUENCY DOWN-CONVERSION AND REMOTING

BACKGROUND

Signal down conversion, particularly in the K and mm wave bands, is important in high bandwidth communication systems. Electronic down conversion is susceptible to signal loss and distortion. Long distance transmission of such electronic signals is also susceptible to electro-magnetic interference.

Optical radio-frequency (RF) carrier generation is useful for ultra-high-frequency operations as well as optically feeding the RF signal to a remote antenna site, with benefits in weight reduction as well as electro-magnetic interference immunity. However, no system or methodology exists to implement signal down conversion with optical carriers to create a local oscillator.

It would be advantageous to generate optical RF carriers with amplitude and phase-modulation to enable high-order quadrature amplitude modulation with the possibility of optically remoting the modulated signal.

SUMMARY

In one aspect, embodiments of the inventive concepts disclosed herein are directed to a system for optically down-converting an RF signal via push-pull phase modulation. Separately tuned optical bandpass filters pass through one or more harmonics and inverse harmonics based on the RF signal to produce a local oscillator.

In a further aspect, embodiments of the inventive concepts disclosed herein are directed to a laser driven signal generator. The signal generator includes a first and second bandpass filter that pass through a first harmonic and first inverse harmonic respectively from an optical field produced via phase modulation of the laser. The first bandpass filter and the second bandpass filter combine the first harmonic and the inverse first harmonic to produce a coherent interference signal.

In a further aspect, embodiments of the inventive concepts disclosed herein are directed to a balanced photodetector that receives a coherent interference signal and derives a down-converted local oscillator from a harmonic and an inverse harmonic based on an RF signal.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
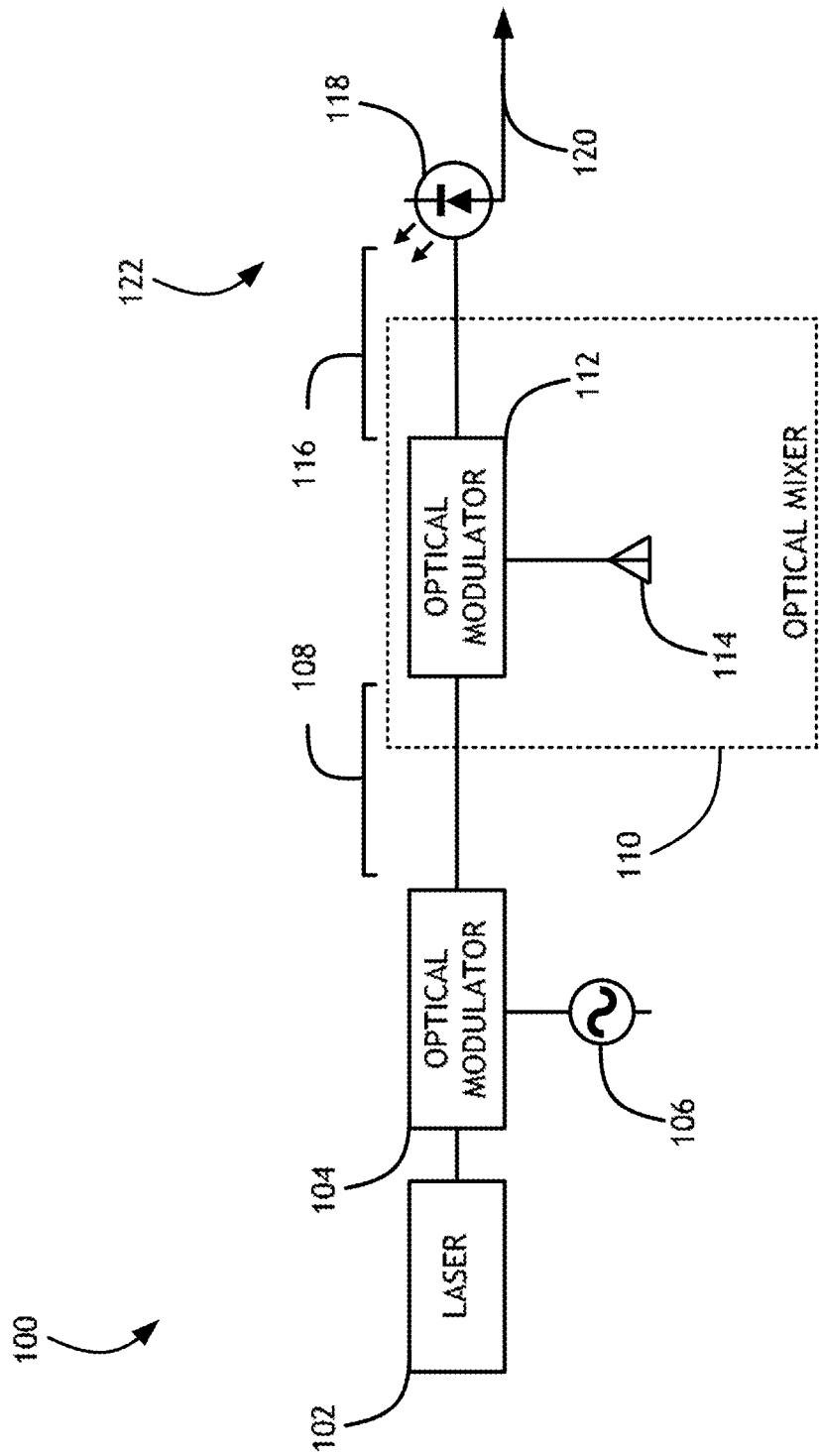
FIG. 1 shows a block diagram of an exemplary embodiment of an optical mixing and down-conversion system.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for optically down-converting a radio-frequency (RF) signal with push-pull phase modulators and separately tuned optical bandpass filters that pass through one or more harmonics and inverse harmonics based on the RF signal. A balanced photo-detector receives a coherent interference signal and derives the down-converted local oscillator from the filtered harmonic and inverse harmonic.

Referring to FIG. 1, a block diagram of an exemplary embodiment of an optical mixing and down-conversion system 100 is shown. The system 100 includes a continuous wave laser 102 in optical communication with an optical modulator 104 which receives an RF waveform 106. The optical modulator 104 is in optical communication with an optical mixer 110 comprising an optical modulator 112 and an RF antenna 114. The optical modulator 112 of the optical mixer 110 is in optical communication with a detector 122.

Based on the RF waveform 106 corresponding to a local oscillator, the optical modulator 104 produces a modulated optical waveform 108. The modulated optical waveform 108 is delivered remotely to the optical modulator 112 and the RF antenna 114 applies an RF frequency to the modulated optical waveform 108 to produce a mixed optical waveform 116. The RF antenna 114 may be configured to receive signals in a range including the K band and the millimeter band (for example, 20-100 GHz). K and mm wave bands can be down-converted and transported optically over large distances with negligible loss, roll-off, and distortion as well as electromagnetic interference immunity because optical fibers are non-conductive.

The mixed optical waveform 116 is then delivered to the detector 122. In some embodiments, the detector 122 comprises a photodiode 118 that produces a current 120 based on the mixed optical waveform 116.

Figure 2:
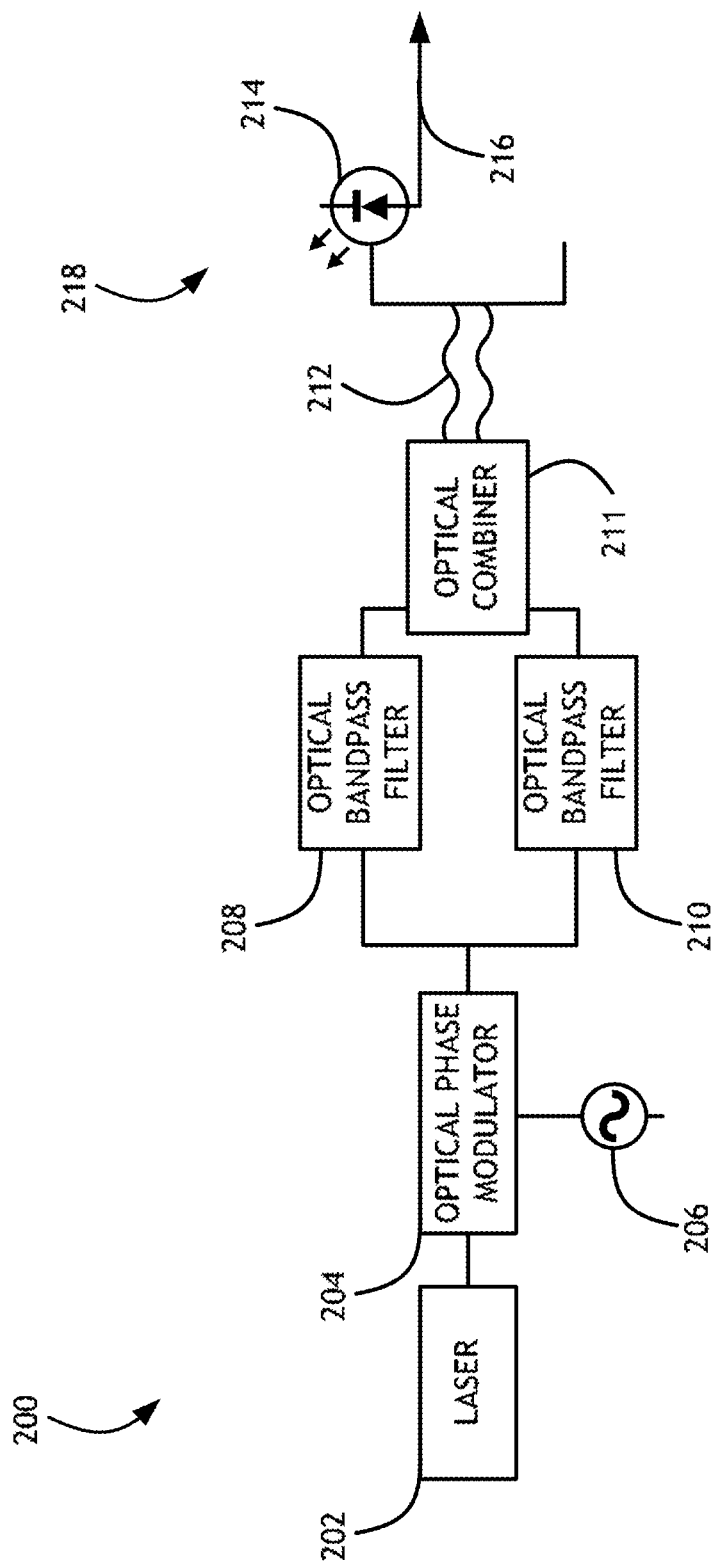
FIG. 2 shows a block diagram of a phase modulation and local oscillator system.

Referring to FIG. 2, a block diagram of a phase modulation and local oscillator system 200 is shown. In some embodiments, a system 200 for down-converting a carrier includes a continuous wave laser 202 in optical communication with an optical phase modulator 204 which is in optical communication with a first optical bandpass filter 208 and a second optical bandpass filter 210. The first optical bandpass filter 208 and second optical bandpass filter 210 are in optical communication with a detector 218. In some embodiments, the detector 218 comprises a photodiode 214.

The optical phase modulator 204 receives an RF waveform 206. Light from the continuous wave laser 202 may have a monochromatic electrical field, and in at least one exemplary embodiment, a carrier frequency of 193.1 THz. Phase modulation results in an optical field with a spectrum defined by $E=A\Sigma_n J_n(\beta)\cos((\omega_{optical}+n\omega_{local\ oscillator})t)$. Based on the RF waveform 206, the optical phase modulator 204 produces an optical field having sideband harmonics that are some multiple of the RF waveform 206; for example, double the RF waveform 206. The optical field is delivered to the first optical bandpass filter 208 and the second optical bandpass filter 210. The first optical bandpass filter 208 and second optical bandpass filter 210 each pass through a component of the optical field (for example n=±1) which are then combined via an optical combiner 211 to produce a coherent interference signal 212 that may be transmitted over a distance (remoting) to the detector 218.

In some embodiments, the photodiode 214 receives a direct current (DC) and produces an output current 216 with a frequency corresponding to the optical field and a high frequency (HF). The detector 218 may be a square law device, such that $I \cong |E|^2$. The current from the photodiode 214 has the form: $I \cong DC + \sin(2n\omega_{local\ oscillator}t) + HF$. Therefore, if the first optical bandpass filter 208 and second optical bandpass filter 210 had filtered two spectral components (n=±2), the current 216 would be of the form $I \cong DC + \sin(4\omega_{local\ oscillator}t) + HF$.

Figure 3:
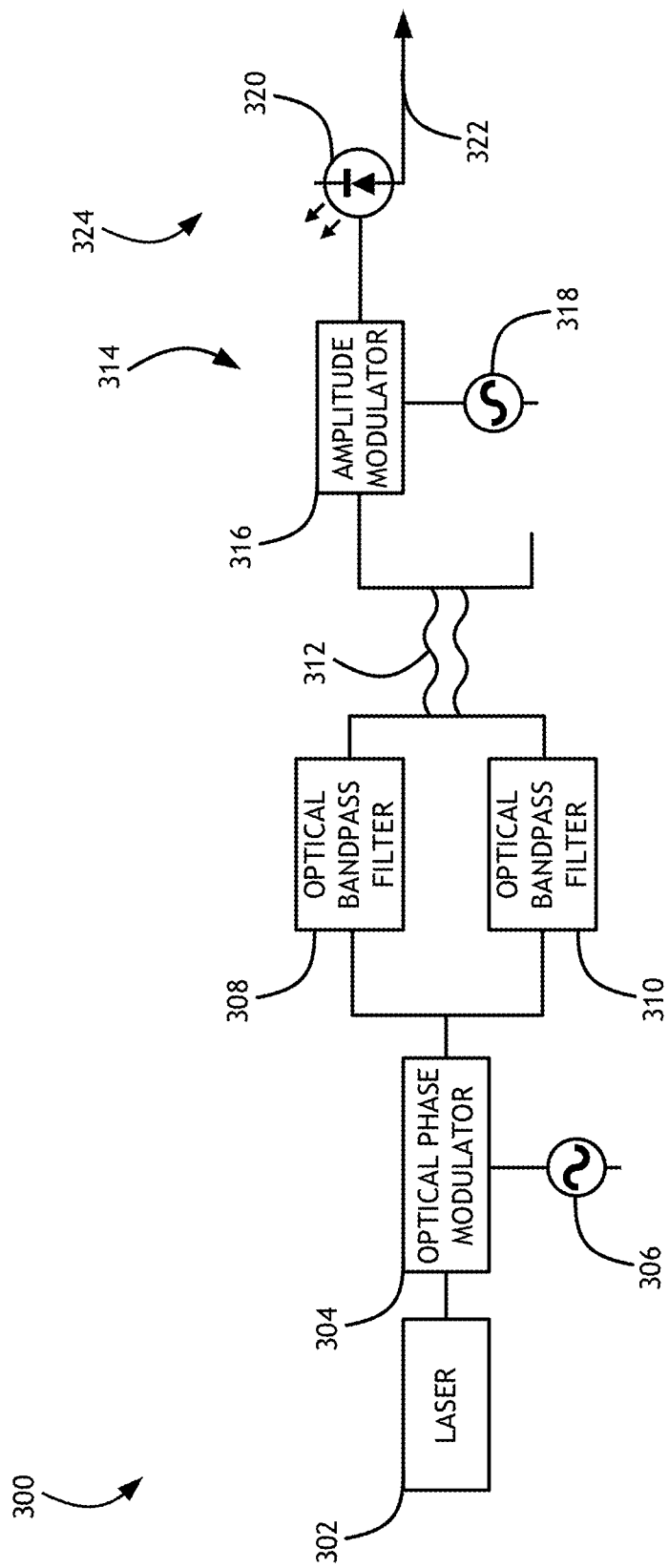
FIG. 3 shows a block diagram of an optical down-conversion system.

Referring to FIG. 3, a block diagram of an optical down-conversion system 300 is shown. In some embodiments, the system 300 includes a continuous wave laser 302 in optical communication with an optical phase modulator 304 which is in optical communication with a first optical bandpass filter 308 and a second optical bandpass filter 310. The first optical bandpass filter 308 and second optical bandpass filter 310 are in optical communication with an optical mixer 314 comprising an amplitude modulator 316. The optical mixer 314 is in optical communication with a detector 324. In some embodiments, the detector 324 comprises a photodiode 320.

The optical phase modulator 304 receives an RF waveform 306. Phase modulation results in an optical field with an optical spectrum. Based on the RF waveform 306, the optical phase modulator 304 produces an optical field having harmonics that are some multiple of the RF waveform 306; for example, double the RF waveform 306. The optical field is delivered to the first optical bandpass filter 308 and the second optical bandpass filter 310. The first optical bandpass filter 308 and second optical bandpass filter 310 each pass through a component of the optical field (for example n=±1) which are then combined to produce a coherent interference signal 312 that may be remoted to the optical mixer 314 and then to the detector 324. In some embodiments, the amplitude modulator 316 is driven by an RF signal 318.

In some embodiments, the photodiode 320 receives a DC signal that produces a current 322 based on the amplitude modulated optical field signal from the optical mixer 314.

In some embodiments, mixing can also be implemented with dual, differential optical phase modulation inside a Mach-Zehnder interferometer as opposed to amplitude modulation.

Figure 4:
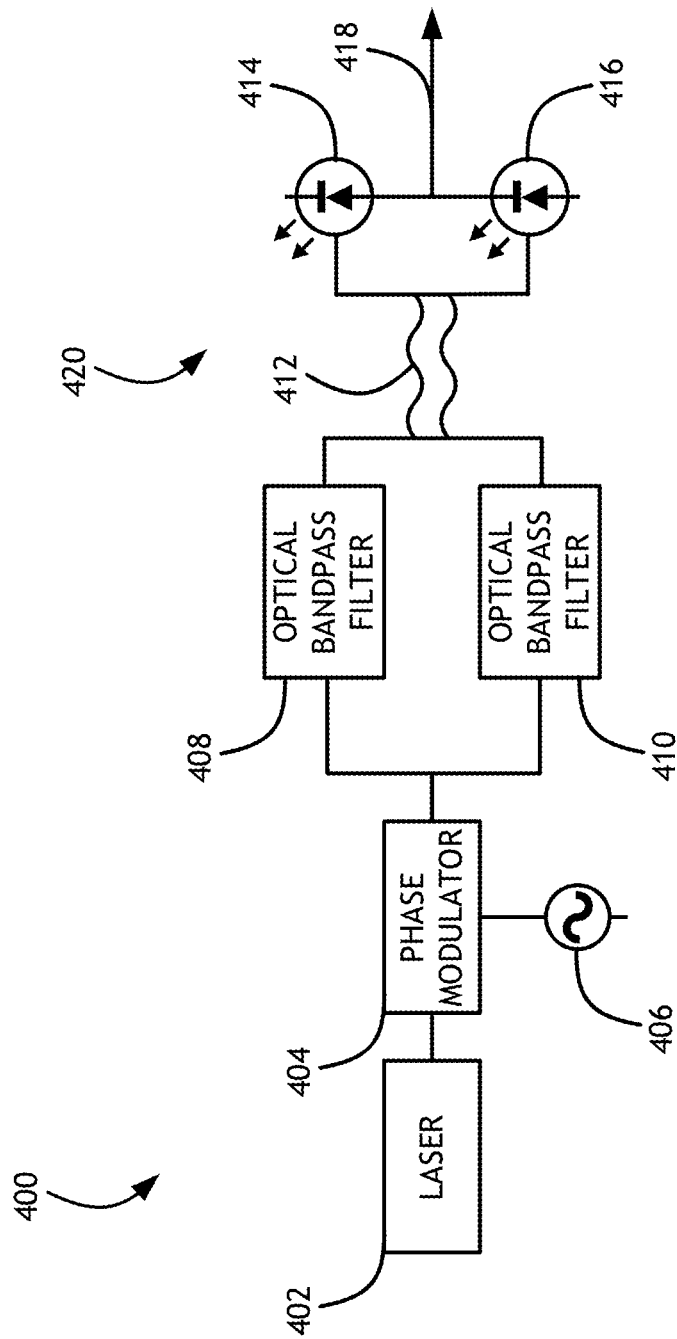
FIG. 4 shows a block diagram of an exemplary embodiment of a local oscillator generation system.

Referring to FIG. 4, a block diagram of an exemplary embodiment of a local oscillator generation system 400 is shown. In some embodiments, the system 400 includes a continuous wave laser 402 in optical communication with an optical phase modulator 404. The optical phase modulator 404 is in optical communication with a first optical bandpass filter 408 and a second optical bandpass filter 410. The first optical bandpass filter 408 and second optical bandpass filter 410 are in optical communication with a detector 420. In some embodiments, the detector 420 comprises a balanced photo-detector including a first photodiode 414 and a second photodiode 416. The anode of the first photodiode 414 may be connected to the cathode of the second photodiode 416.

The optical phase modulator 404 receives an RF waveform 406. Based on the RF waveform 406, the optical phase modulator 404 produces an optical waveform having harmonics that are some multiple of the RF waveform 406; for example, four times the RF waveform 406. The optically modulated laser waveform is delivered to the first optical bandpass filter 408 and the second optical bandpass filter 410. The first optical bandpass filter 408 and second optical bandpass filter 410 each pass through a desired harmonic which are then combined to produce a coherent interference signal 412 that may be remoted to the detector 420.

In some embodiments, the first photodiode 414 and second photodiode 416 may interact to produce an RF carrier 418 with a frequency corresponding to the RF waveform 406.

Figure 5:
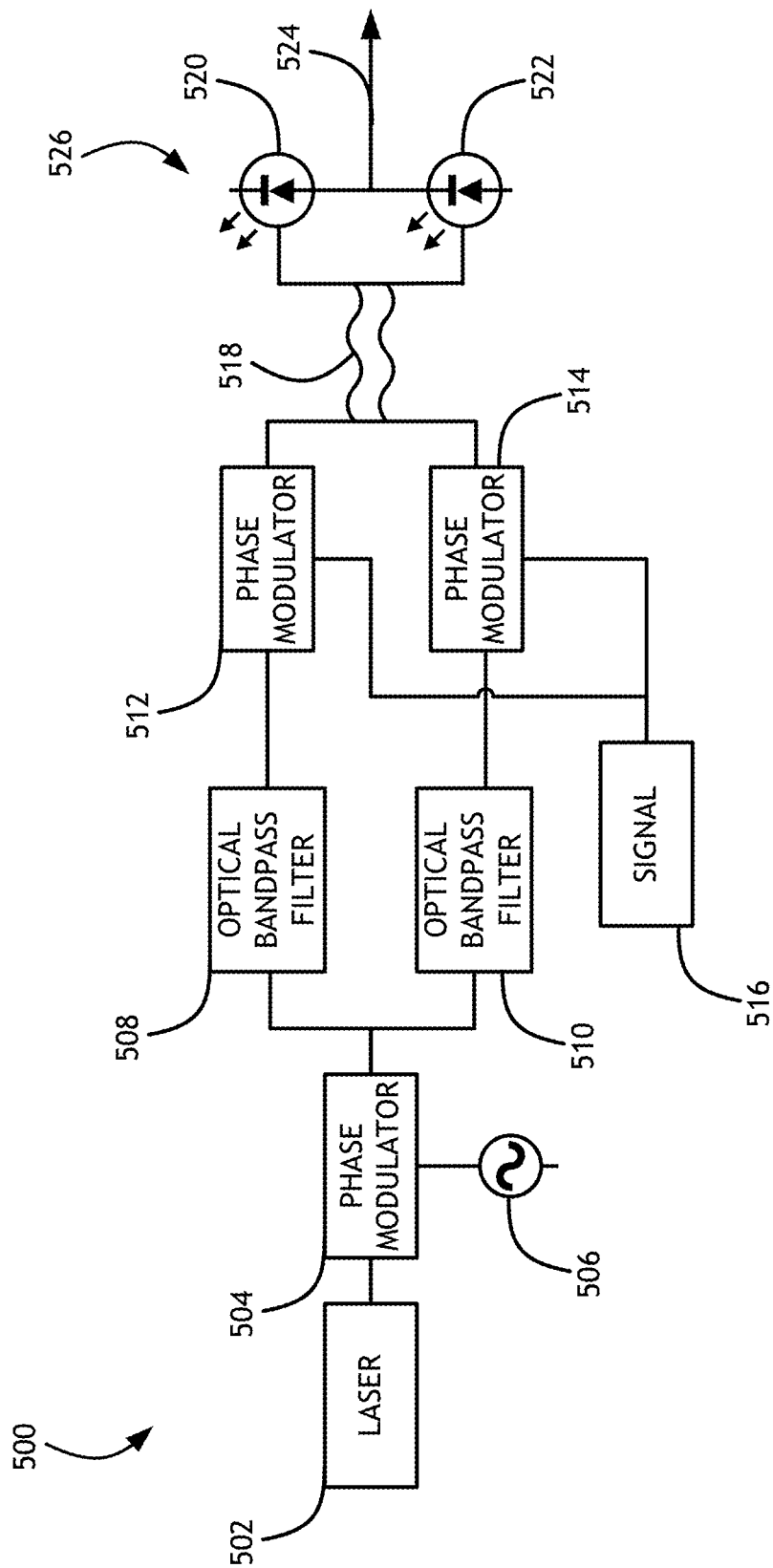
FIG. 5 shows a block diagram of an exemplary embodiment of a tunable optical down-conversion system.

Referring to FIG. 5, a block diagram of an exemplary embodiment of a tunable optical down-conversion system 500 is shown. In some embodiments, the system 500 includes a continuous wave laser 502 in optical communication with a first optical phase modulator 504 which is in optical communication with a first optical bandpass filter 508 and a second optical bandpass filter 510. The first optical bandpass filter 508 is in optical communication with a second optical phase modulator 512 and the second optical bandpass filter 510 is in optical communication with a third optical phase modulator 514. The second optical phase modulator 512 and third optical phase modulator 514 are both connected to a signal generator 516 such as an RF signal generator or a QAM single generator. The second optical phase modulator 508 and third optical phase modulator 514 are in optical communication with a detector 526. In some embodiments, the detector 526 comprises a balanced photo-detector including a first photodiode 520 and a second photodiode 522. The anode of the first photodiode 520 may be connected to the cathode of the second photodiode 522.

The first optical phase modulator 504 receives an RF waveform 506. Based on the RF waveform 506, the first optical phase modulator 504 produces a phase modulated optical waveform having harmonics that are some multiple of the RF waveform 506.

The phase modulated optical waveform is delivered to the first optical bandpass filter 508 and the second optical bandpass filter 510. The first optical bandpass filter 508 and second optical bandpass filter 510 each pass through a desired harmonic. The filtered signal from the first optical bandpass filter 508 passes through the second optical phase modulator 512, and the filtered signal from the second optical bandpass filter 510 passes through the third optical phase modulator 514; each of the second optical phase modulator 512 and third optical phase modulator 514 being driven by the signal generator 516, with one of the second optical phase modulator 512 or third optical phase modulator 514 receiving an inverted signal (a signal having opposite phase) from the signal generator 516. Compared to conventional, electrical down-conversion, such "push-pull" phase modulation offers superior phase stability because heating is cancelled due to common mode architecture, superior linearity because smaller voltage swings may be applied for the same amount of effective net phase shift, and superior efficiency because voltage swings are reduced by a factor of 2 on the second optical phase modulator 512 and third optical phase modulator 514 halves the total RF power. RF modulation bandwidth of optical phase modulators 512, 514 can approach 100 GHz.

Signals from the second optical phase modulator 512 and third optical phase modulator 514 are then combined to produce a coherent interference signal 518 that may be remoted to the detector 526.

Local oscillator tunability using optical bandpass filters 508, 510 can be achieved over one octave, provided the first harmonic is used to generate the local oscillator, and the optical bandpass-filters 508, 510 are rectangular filters with upper and lower cutoff chosen such that $f_{upper/lower}=2$.

In some embodiments, the first photodiode 520 and second photodiode 522 may interact to produce an RF carrier 524 with a frequency corresponding to the RF waveform from the signal generator 516. The use of a balanced photo-detector results in 6 dB more local oscillator and/or intermediate frequency power. If no signal is generated from the signal generator 516, then the RF carrier 524 is a pure local oscillator tone at twice the frequency of the local oscillator.

Phase modulation to generate the local oscillator harmonics improves efficiency of local oscillator generation. The choice of whether to use the first harmonics ($N=\pm 1$), second harmonics ($N=\pm 2$) or higher order harmonics is based on factors such as the desired local oscillator frequency range and capabilities of the synthesizer delivering the RF waveform 506. The optimum choice for a tunable local oscillator will often be the first harmonic; however, the second harmonic can also be used to extend the local oscillator range harmonic.

Figure 6A:
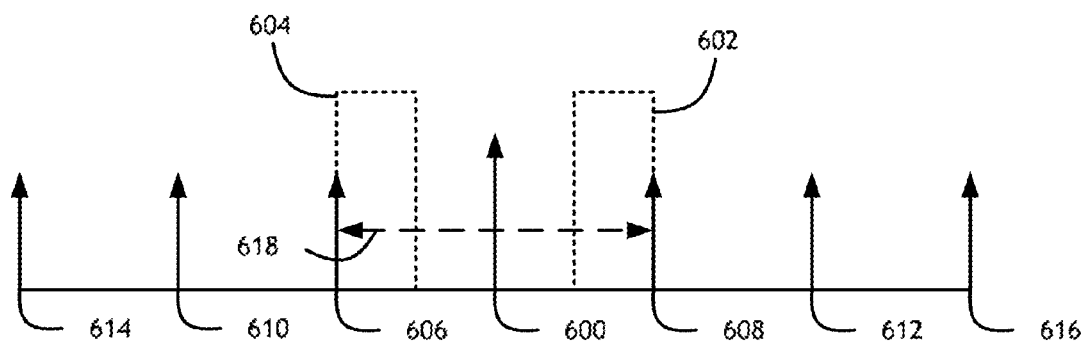
FIG. 6A shows a representation of optical down-converter tuning using the first harmonic.
Figure 6B:
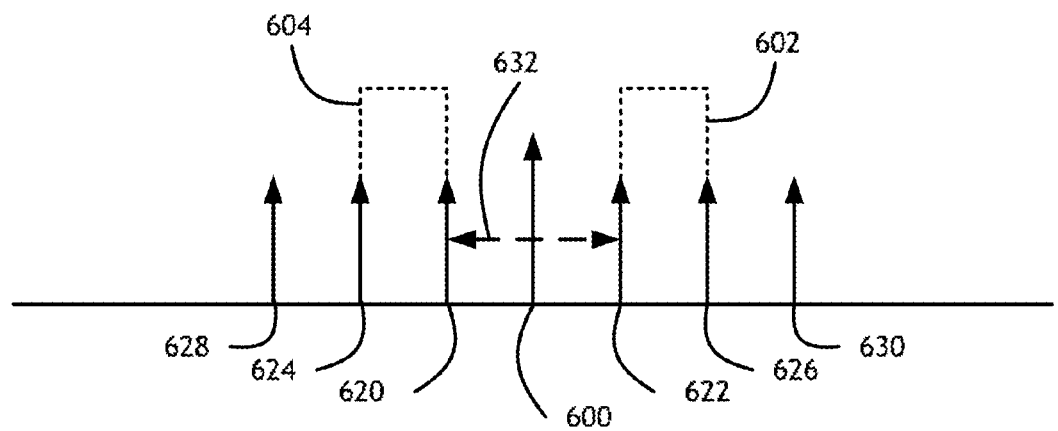
FIG. 6B shows a representation of optical down-converter tuning using the first harmonic.

Referring to FIGS. 6A and 6B, representations of optical down-converter tuning using the first harmonic are shown. In some embodiments, an optical field includes a carrier 600, first harmonics 606, 608, second harmonics 610, 612, and third harmonics 614, 616. A generator generates a local oscillator tone 618 at a certain frequency; for example 60 GHz. The desired RF local oscillator power is generated when a component, such as an optical phase modulator, at $f_{local\ oscillator}$ interferes with a component at $-f_{local\ oscillator}$ and is square-law detected by a photodiode. The RF local oscillator oscillates in a positive frequency range 602 and a negative frequency range 604 defined by a high frequency ($f_{max}$) corresponding to the first harmonic 606, 608, and a low frequency ($f_{min}$). To guarantee that only one local oscillator tone is present, $f_{min}$ must equal the lowest value of $f_{local\ oscillator}$ ($f_{local\ oscillator,min}$), and $f_{max}$ must equal the highest value of $f_{local\ oscillator}$ ($f_{local\ oscillator,max}$) such that $f_{max}=2f_{min}$. By altering the signal applied to the optical phase modulators, $f_{local\ oscillator}$, and therefore all corresponding harmonics, can be tuned between $f_{min}$ and $2f_{min}$. By tuning, a tuned first harmonic 620, 622, tuned second harmonic 624, 626, and tuned third harmonic 628, 630 may be brought into conformity with the frequency ranges 602, 604 such that a local oscillator minimum 632 corresponds to the tuned first harmonic 620, 622 while $f_{max}$ corresponds to the tuned second harmonic 624, 626. The tunable frequency range is $2f_{min}$ or 1 octave; for example 30 GHz to 60 GHz, and only one local oscillator tone is ever present over the entire tunable frequency range. Further, the local oscillator frequency source only needs to be swept from 15 GHz to 30 GHz for an optical local oscillator to cover 30 GHz to 60 GHz.

Figure 7A:
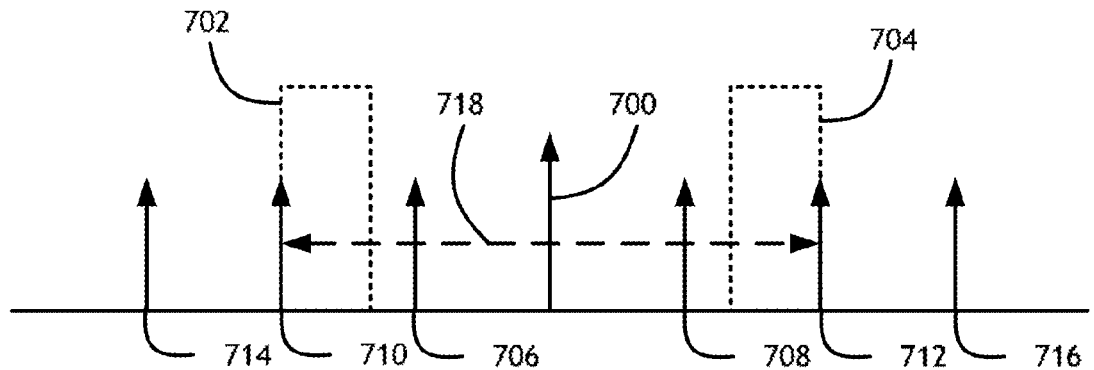
FIG. 7A shows a representation of optical down-converter tuning using the second harmonic.
Figure 7B:
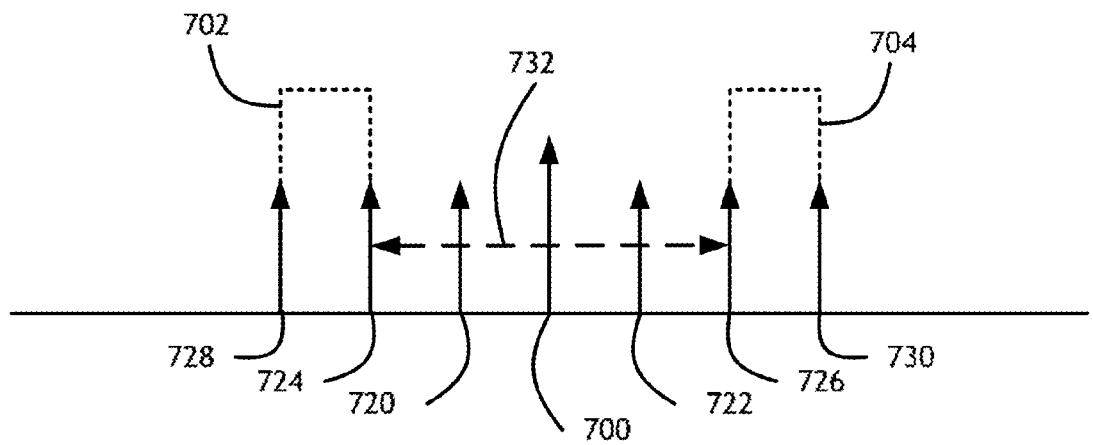
FIG. 7B shows a representation of optical down-converter tuning using the second harmonic.

Referring to FIGS. 7A and 7B, representations of optical down-converter tuning using the second harmonic are shown. In some embodiments, an optical field includes a carrier 700, first harmonics 706, 708, second harmonics 710, 712, and third harmonics 714, 716. A generator generates a local oscillator tone 718 at a certain frequency; for example 50 GHz. The desired RF local oscillator power is generated when a component, such as an optical phase modulator, at $f_{local\ oscillator}$ interferes with a component at $-f_{local\ oscillator}$ and is square-law detected by a photodiode. The RF local oscillator oscillates in a positive frequency range 702 and a negative frequency range 704 defined by a high frequency ($f_{max}$) corresponding to the second harmonic 710, 712 and a low frequency ($f_{min}$). To guarantee that only one local oscillator tone is present, $f_{min}$ must equal twice the lowest value of $f_{local\ oscillator}$ ($2f_{local\ oscillator,min}$), and $f_{max}$ must equal three times the highest value of $f_{local\ oscillator}$ ($3f_{local\ oscillator,max}$) such that $f_{max}=3/2f_{min}$. By altering the signal applied to the optical phase modulators, $f_{local\ oscillator}$, and therefore all corresponding harmonics, can be tuned between $f_{min}$ and $3/2f_{min}$. By tuning, a tuned first harmonic 720, 722, tuned second harmonic 724, 726, and tuned third harmonic 728, 730 may be brought into conformity with the frequency ranges 702, 704 such that a local oscillator minimum 732 corresponds to the tuned second harmonic 724, 726 while $f_{max}$ corresponds to the tuned third harmonic 728, 730. The tunable frequency range is $1.5f_{min}$ or 0.6 octaves; for example 60 GHz to 90 GHz, and only one local oscillator tone is ever present over the entire tunable frequency range. Further, the local oscillator frequency source only needs to be swept from 15 GHz to 30 GHz for an optical local oscillator to cover 60 GHz to 90 GHz.

Figure 8:
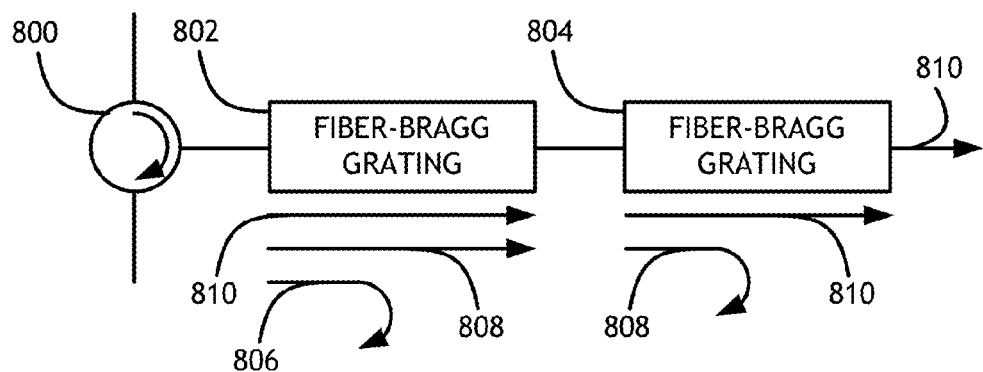
FIG. 8 shows a block diagram of Fiber-Bragg Grating filters incorporated into a main transmission fiber.
Figure 9:
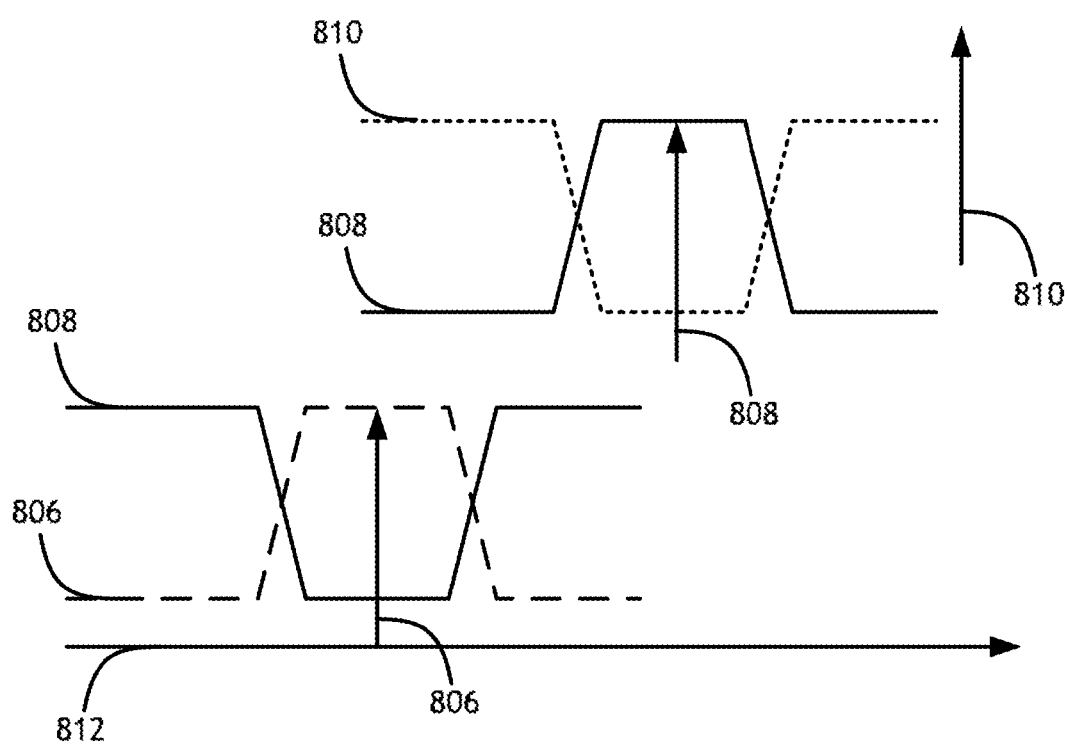
FIG. 9 shows a representation of signal transmission in a Fiber-Bragg Grating filter.

Referring to FIGS. 8 and 9, a block diagram of Fiber-Bragg Grating filters 802, 804 incorporated into a main transmission fiber and a representation of signal transmission in a Fiber-Bragg Grating filter 802, 804 are shown. In some embodiments, an optical circulator 800 is incorporated into a main transmission line. The optical circulator 800 is connected to a first Fiber-Bragg Grating filter 802 and a second Fiber-Bragg Grating filter 804. Fiber-Bragg Grating filters 802, 803 are a type of optical fiber-based interference filter which are made with low insertion loss and steep skirts that work by making refractive index changes in the fiber that reflect only a certain range of wavelengths (the passband). Energy that is not reflected is transmitted through the Fiber-Bragg Grating filters 802, 804 with low loss. In some embodiments, a 3 dB coupler may be used in place of the optical circulator 800.

In some embodiments, the first Fiber-Bragg Grating filter 802 receives a signal corresponding to the complete optical field 812. The first Fiber-Bragg Grating filter 802 reflects a first harmonic 806 back to the optical circulator 800, and thereby to the main transmission fiber, and passes through higher harmonics 808, 810. Likewise, the second Fiber-Bragg Grating filter 804, in optical communication with the first Fiber-Bragg Grating filter 802, reflects a second harmonic 808 back to the optical circulator 800 through the first Fiber-Bragg Grating filter 802, and thereby to the main transmission fiber, and passes through higher harmonics 810.

Figure 10:
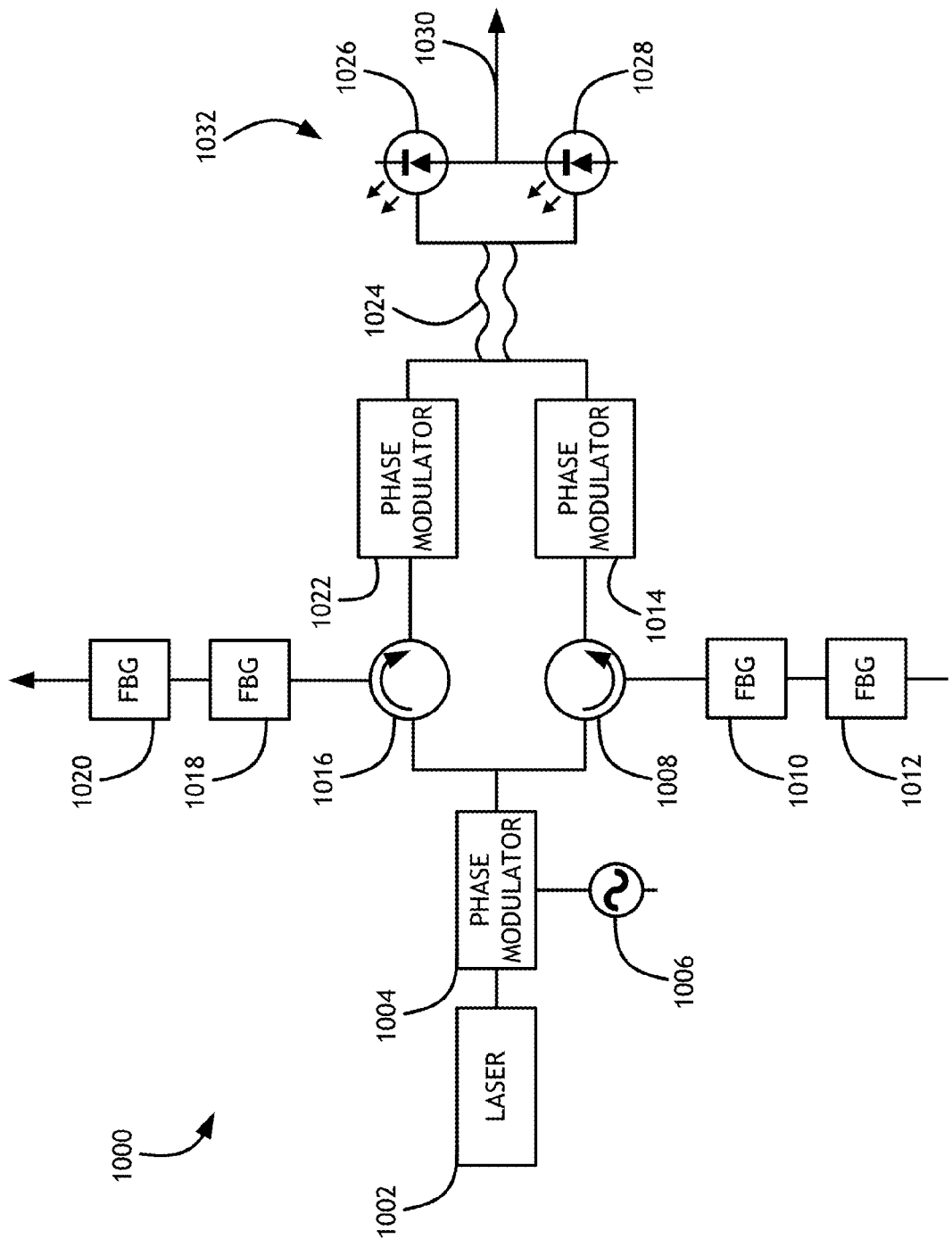
FIG. 10 shows a block diagram of an exemplary embodiment of an optical down-conversion system with a tunable laser.

Referring to FIG. 10, a block diagram of an exemplary embodiment of an optical down-conversion system 1000 with a tunable laser is shown. In some embodiments, the system 1000 includes a continuous wave laser 1002 in optical communication with a first optical phase modulator 1004 which is in optical communication with a first optical circulator 1008 and a second optical circulator 1016. The first optical circulator 1008 is serially connected to a first Fiber-Bragg Grating filter 1010 and a second Fiber-Bragg Grating filter 1012. The first Fiber-Bragg Grating filter 1010 reflects a first harmonic back to the first optical circulator 1008 and thereby to a second optical phase modulator 1014. The second Fiber-Bragg Grating filter 1012 reflects a second harmonic back to the first Fiber-Bragg Grating filter 1010 and first optical circulator 1008, and thereby to the second optical phase modulator 1014.

The second optical circulator 1016 is serially connected to a third Fiber-Bragg Grating filter 1018 and a fourth Fiber-Bragg Grating filter 1020. The third Fiber-Bragg Grating filter 1018 reflects a first harmonic back to the second optical circulator 1016 and thereby to a third optical phase modulator 1022. The fourth Fiber-Bragg Grating filter 1020 reflects a second harmonic back to the third Fiber-Bragg Grating filter 1018 and second optical circulator 1016, and thereby to the third optical phase modulator 1022.

The second optical phase modulator 1014 and third optical phase modulator 1022 are in optical communication with a detector 1032. In some embodiments, the detector 1032 comprises a balanced photo-detector including a first photodiode 1026 and a second photodiode 1028. The anode of the first photodiode 1026 may be connected to the cathode of the second photodiode 1028.

The first optical phase modulator 1004 receives an RF waveform 1006. Based on the RF waveform 1006, the first optical phase modulator 1004 produces a phase modulated optical waveform having harmonics that are some multiple of the RF waveform 1006. The phase modulated optical waveform is then delivered to the first optical circulator 1008 and the second optical circulator 1016.

A person skilled in the art may appreciate that the Fiber-Bragg Grating filters 1010, 1012, 1018, and 1020 may be tuned to reflect harmonics other than the first harmonic and second harmonic. If a tuning range of one octave is too limiting, the tuning range can be expanded by centering the Fiber-Bragg Grating filters 1010, 1012, 1018, and 1020 at different optical wavelengths, each with different offset-cutoffs; for example, 15 GHz-30 GHz and 30 GHz-45 GHz.

Signals from the second optical phase modulator 1014 and third optical phase modulator 1022 are then combined to produce a coherent interference signal 1024 that may be transmitted over a distance (remoting) to the detector 1032.

In some embodiments, the first photodiode 1026 and second photodiode 1028 may interact to produce an RF carrier 1030. The RF carrier 1030 is a pure local oscillator tone corresponding to the frequency of the RF waveform 1006.

Figure 11:
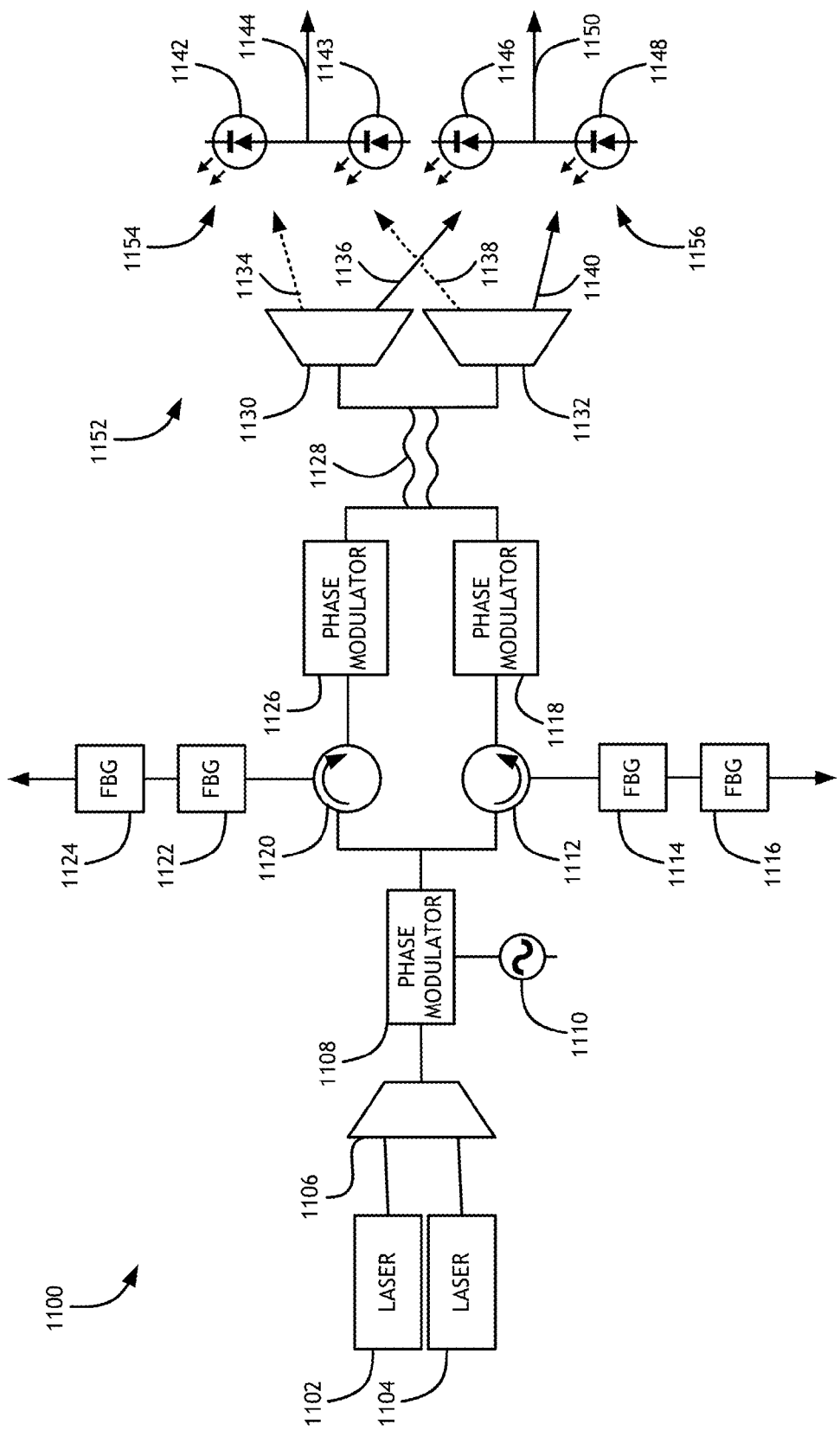
FIG. 11 shows a block diagram of an exemplary embodiment of a tunable optical multiband down-conversion system.

Referring to FIG. 11, a block diagram of an exemplary embodiment of a tunable optical multiband down-conversion system 1100 is shown. In some embodiments, the system 1100 includes a plurality of continuous wave lasers 1102, 1104 in optical communication with a wavelength multiplexer 1106 which is in optical communication with a first optical modulator 1108. The first optical modulator 1108 is in optical communication with a first optical circulator 1112 and a second optical circulator 1120. The first optical circulator 1112 is serially connected to a first Fiber-Bragg Grating filter 1114 and a second Fiber-Bragg Grating filter 1116. The first Fiber-Bragg Grating filter 1114 reflects a first harmonic back to the first optical circulator 1112 and thereby to a second optical phase modulator 1118. The second Fiber-Bragg Grating filter 1116 reflects a second harmonic back to the first Fiber-Bragg Grating filter 1114 and first optical circulator 1112, and thereby to the second optical phase modulator 1118.

The second optical circulator 1120 is serially connected to a third Fiber-Bragg Grating filter 1122 and a fourth Fiber-Bragg Grating filter 1124. The third Fiber-Bragg Grating filter 1122 reflects a first harmonic back to the second optical circulator 1120 and thereby to a third optical phase modulator 1126. The fourth Fiber-Bragg Grating filter 1124 reflects a second harmonic back to the third Fiber-Bragg Grating filter 1122 and second optical circulator 1120, and thereby to the third optical phase modulator 1126.

The second optical phase modulator 1118 and third optical phase modulator 1126 are in optical communication with a detector 1152. In some embodiments, the detector 1152 comprises one or more wavelength demultiplexers 1130, 1132 and sets of balanced photo-detectors 1154, 1156. Each balanced photo-detector 1154, 1156 including a first photodiode 1142, 1146 and a second photodiode 1143, 1148.

The wavelength multiplexer 1106 combines light from the plurality of continuous wave lasers 1102, 1104 into a single beam that is delivered to the first optical phase modulator 1108.

The first optical phase modulator 1108 receives an RF waveform 1110. Based on the RF waveform 1110, the first optical phase modulator 1108 produces a phase modulated optical waveform having harmonics that are some multiple of the RF waveform 1110. The phase modulated optical waveform is then delivered to a first optical circulator 1112 and a second optical circulator 1120.

The first optical circulator 1112 is serially connected to a first Fiber-Bragg Grating filter 1114 and a second Fiber-Bragg Grating filter 1116. The first Fiber-Bragg Grating filter 1114 reflects a first harmonic back to the first optical circulator 1112 and thereby to a second optical phase modulator 1118. The second Fiber-Bragg Grating filter 1116 reflects a second harmonic back to the first Fiber-Bragg Grating filter 1114 and first optical circulator 1112, and thereby to the second optical phase modulator 1118.

The second optical circulator 1120 is serially connected to a third Fiber-Bragg Grating filter 1122 and a fourth Fiber-Bragg Grating filter 1124. The third Fiber-Bragg Grating filter 1122 reflects a first harmonic back to the second optical circulator 1120 and thereby to a third optical phase modulator 1126. The fourth Fiber-Bragg Grating filter 1124 reflects a second harmonic back to the third Fiber-Bragg Grating filter 1122 and second optical circulator 1120, and thereby to the third optical phase modulator 1126. A person skilled in the art may appreciate that the Fiber-Bragg Grating filters 1110, 1112, 1118, and 1120 may be tuned to reflect harmonics other than the first harmonic and second harmonic. If a tuning range of one octave is too limiting, the tuning range can be expanded by centering the Fiber-Bragg Grating filters 1110, 1112, 1118, and 1120 at different optical wavelengths, each with different offset-cutoffs; for example, 15 GHz-30 GHz and 30 GHz-45 GHz. Signals from the second optical phase modulator 1118 and third optical phase modulator 1126 are then combined to produce a coherent interference signal 1128 that may be transmitted over a distance (remoting) to the detector 1152.

Each of the one or more wavelength demultiplexers 1130, 1132 extracts the wavelengths 1134, 1136, 1138, and 1140 comprising the coherent interference signal 1128 and delivers such wavelengths 1134, 1136, 1138, and 1140 to the corresponding sets of balanced photo-detectors 1154, 1156. The first photodiode 1142, 1146 and second photodiode 1143, 1148 in each set may interact to produce RF carriers 1144, 1150.

In some embodiments, all bands can be accessed simultaneously by injecting the desired wavelengths from the plurality of continuous wave lasers 1102, 1104 and then extracting each wavelength 1134, 1136, 1138, and 1140 via the plurality of wavelength demultiplexers 1130, 1132. Such embodiment may be faster to tune over multiple RF bands, cheaper, and more robust than methods requiring tunable lasers. Multiple RF bands may be down-converted simultaneously, and thus a wider RF tuning range can be covered simultaneously.

In some embodiments, a single, multi-wavelength first optical phase modulator 1108 can be replaced with several wavelength-dedicated optical phase modulators 1118, 1126 for increased flexibility.

Figure 12:
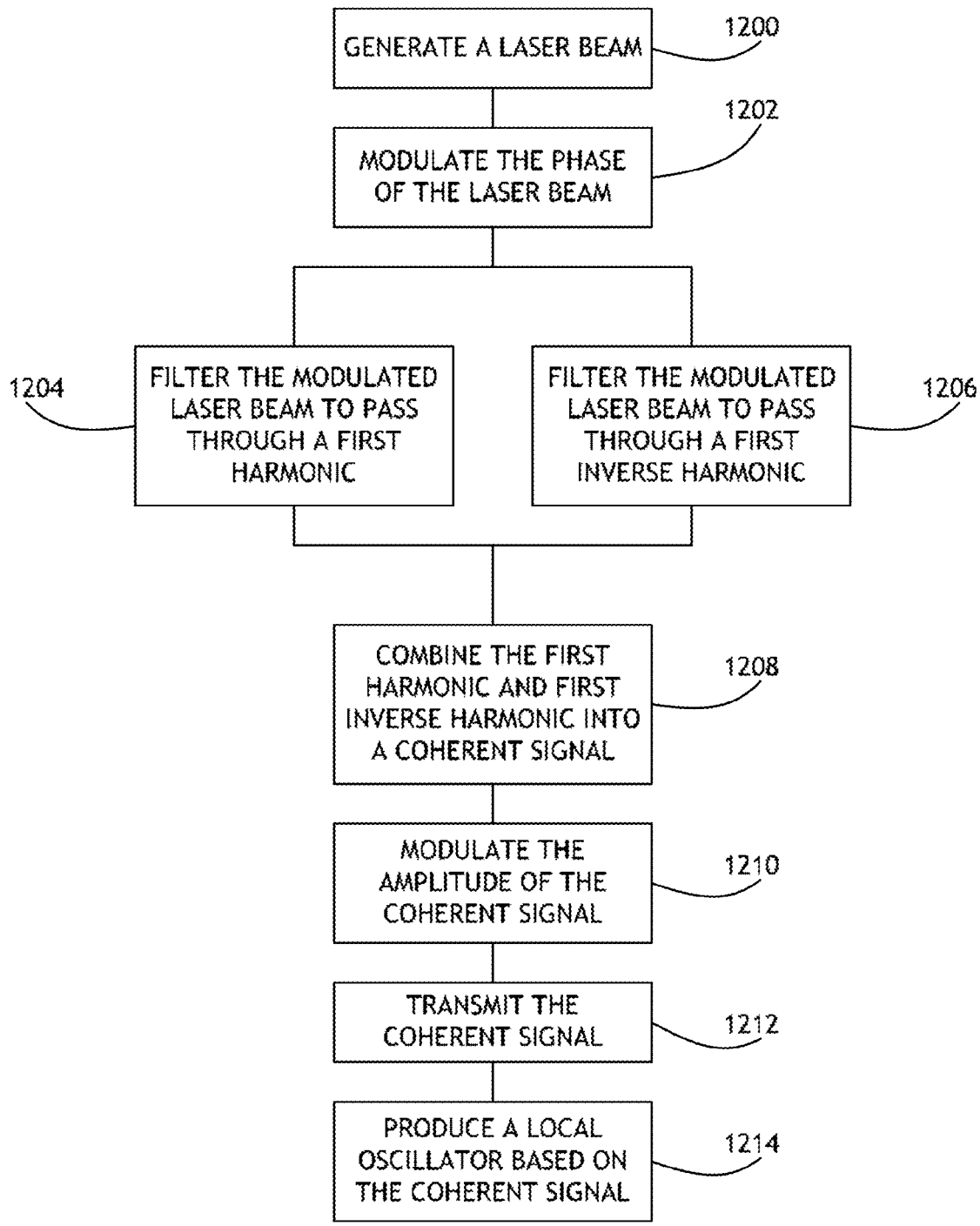
FIG. 12 shows a flowchart of an exemplary method for optically generating a local oscillator according to the inventive concepts disclosed herein.

Referring to FIG. 12, a flowchart of an exemplary method for optically generating a local oscillator according to the inventive concepts disclosed herein is shown. In some embodiments, the method includes generating 1200 a laser beam and modulating 1202 the phase of the laser beam. The phase modulated laser beam filtered 1204 to pass through a first harmonic and also filtered 1206 to pass through an inverse first harmonic.

The first harmonic and inverse first harmonic are combined 1208 to produce a coherent interference signal. The coherent interferences signal is transmitted 1212 to a receiver that produces 1214 a local oscillator based on the coherent interference signal. In some embodiments, the coherent interference signal may be amplitude modulated 1210 before transmission.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. An optical down conversion system comprising:
   a laser;
   an initial optical phase modulator in optical communication with the laser;
   a frequency generator connected to the initial optical phase modulator and configured to modulate an optical field received from the laser to produce harmonics in the optical field;
   a first bandpass filter optically coupled with the initial optical phase modulator and configured to pass through a harmonic from the optical field;
   a second bandpass filter optically coupled with the initial phase modulator and configured to pass through an inverse harmonic from the optical filed; and
   a detector optically coupled with the first and second bandpass filters and configured to:
      receive a signal comprising the harmonic and inverse harmonic; and
      produce a down-converted local oscillator based on the harmonic and inverse harmonic.

2. The optical down conversion system of claim 1, wherein the detector comprises a first photodiode and second photodiode, an anode of the first photodiode connected to a cathode of the second photodiode.

3. The optical down conversion system of claim 1, further comprising:
   an amplitude modulator optically interposed between the initial optical phase modulator and the at least two bandpass filters; and
   a signal generator configured to drive the amplitude modulator.

4. The optical down conversion system of claim 1, further comprising:

a phase modulator signal generator;
a first filtered optical phase modulator in optical communication with the first bandpass filter and configured to be driven by a signal from the phase modulator signal generator; and
a second filtered optical phase modulator in optical communication with the second bandpass filter and configured to be driven by an inverted signal from the phase modulator signal generator.

5. The optical down conversion system of claim 3, wherein the signal generator comprises a quadrature amplitude modulation (QAM) signal generator.

6. The optical down conversion system of claim 3, further comprising:
a first filtered optical phase modulator in optical communication with the first bandpass filter and configured to be driven by a signal from the signal generator; and
a second filtered optical phase modulator in optical communication with the second bandpass filter and configured to be driven by an inverted signal from the signal generator.

7. The optical down conversion system of claim 4, wherein at least one of the at least two bandpass filters comprises:
an optical circulator;
a first Fiber-Bragg grating configured to reflect light corresponding to a first harmonic in the optical field; and
a second Fiber-Bragg grating configured to reflect light corresponding to a second harmonic in the optical field.

8. The optical down conversion system of claim 7, wherein the laser comprises a first laser, further comprising:
a second laser; and
a wavelength multiplexer optically interposed between the first laser and the second laser, and the initial optical phase modulator; and
wherein the detector comprises:
one or more wavelength demultiplexers configured to separate the coherent interference signal into a plurality of filtered modulated harmonics of the first laser and the second laser.

9. A method for down-converting a radio frequency signal comprising:
generating a laser beam;
modulating the phase of the laser beam based on a local oscillator frequency generator to produce a phase modulated laser beam;
filtering the phase modulated laser beam with a first filter to pass through a harmonic of the phase modulated laser beam;
filtering the phase modulated laser beam with a second filter to pass through an inverse harmonic of the phase modulated laser beam;
combining the harmonic and the inverse harmonic to produce a coherent interference signal;
transmitting the coherent interference signal to a remote detector; and
producing a local oscillator based on the local oscillator frequency.

10. The method of claim 9, wherein filtering the phase modulated laser beam with a first filter to pass through a harmonic of the phase modulated laser beam comprises passing through at least a first harmonic.

11. The method of claim 9, wherein filtering the phase modulated laser beam with a first filter to pass through a harmonic of the phase modulated laser beam comprises passing through at least a second harmonic.

12. The method of claim 9, further comprising modulating the amplitude of the coherent interference signal.

13. The method of claim 9, wherein generating the laser beam comprises multiplexing a first laser beam in a first wavelength band and a second laser beam in a second wavelength band.

14. A signal generator comprising:
a laser;
an initial optical phase modulator in optical communication with the laser configured to modulate an optical field received from the laser to produce harmonics in the optical field;
a frequency generator connected to the initial optical phase modulator; and
a first bandpass filter in optical communication with the initial optical phase modulator, configured to pass through a harmonic from the optical field;
a second bandpass filter in optical communication with the initial optical phase modulator, configured to pass through an inverse harmonic from the optical field,
wherein:
the first bandpass filter and the second bandpass filter are configured to combine the first harmonic and the inverse first harmonic to produce a coherent interference signal.

15. The signal generator of claim 14, further comprising:
an amplitude modulator optically interposed between the initial optical phase modulator and the first bandpass filter and the second bandpass filter; and
a signal generator configured to drive the amplitude modulator.

16. The signal generator of claim 14, further comprising:
a signal generator;
a first filtered optical phase modulator in optical communication with the first bandpass filter configured to be driven by a signal from the signal generator; and
a second filtered optical phase modulator in optical communication with the second bandpass filter configured to be driven by a signal from the signal generator.

17. The signal generator of claim 15, wherein the signal generator comprises a quadrature amplitude modulation (QAM) signal generator.

18. The signal generator of claim 15, further comprising:
a first filtered optical phase modulator in optical communication with the first bandpass filter, configured to be driven by a signal from the signal generator; and
a second filtered optical phase modulator in optical communication with the second bandpass filter, configured to be driven by a signal from the signal generator.

19. The signal generator of claim 16, wherein at least one of the at least two bandpass filters comprises:
an optical circulator;
a first Fiber-Bragg grating, configured to reflect light corresponding to a first harmonic in the optical field; and
a second Fiber-Bragg grating, configured to reflect light corresponding to a second harmonic in the optical field.

20. The signal generator of claim 19, wherein the laser comprises a first laser operating in a first wavelength band, further comprising:
a second laser operating in a second wavelength band, distinct from the first wavelength band; and
a wavelength multiplexer optically interposed between the first laser and the second laser, and the initial optical phase modulator.

* * * * *